United States Patent

[11] 3,542,407

[72] Inventor Kenneth Brown
Streetly, Sutton Coldfield, England
[21] Appl. No. 735,263
[22] Filed June 7, 1968
[45] Patented Nov. 24, 1970
[73] Assignee Square Tube Systems Limited
Mount Pleasant, Bilstron, England
a British company
[32] Priority June 24, 1967
[33] Great Britain
[31] No. 29251/1967

[54] CONNECTING MEANS FOR JOINING TUBULAR MEMBERS
7 Claims, 5 Drawing Figs.

[52] U.S. Cl. .................................................. 287/54
[51] Int. Cl. .................................................. F16b 7/00
[50] Field of Search .................................... 287/54A, 54C, 54B, 2

[56] References Cited
UNITED STATES PATENTS
2,863,682  12/1958  Canepa .......................... 287/54C
3,000,656  9/1961   Hollaender .................... 287/54CX
3,218,097  11/1965  Bowers et al. ................. 287/54B FOREIGN PATENTS
90,082      8/1937   Sweden ......................... 287/54C
1,061,428   11/1953  France .......................... 287/54A
1,473,856   2/1967   France .......................... 287/54C Primary Examiner—David J. Williamowsky
Assistant Examiner—Andrew V. Kundrat
Attorney—Friedman & Goodman ABSTRACT: Connection means for joining tubular members together including a connection piece comprising a body which is separable on a plane into two body elements. The body elements may have either one or two arms integrally formed therewith and extending in the plane of separation. Body elements without arms are also provided as well as structurally separate arms for assembly with the body elements to extend in a direction transverse to the plane of separation. From these four components eight different types of connection piece can be assembled. Each arm has associated therewith a sleeve which is pressed into contact with the interior of the tube at two longitudinally spaced positions by means of two spaced parallel sided contact portions on each arm cooperating with two internally converging surface portions on the sleeve. A screw cooperates with an anchor disc lodged in the sleeve to pull the arm into the sleeve and wedge it therein.

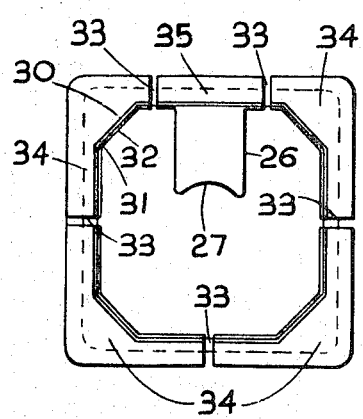
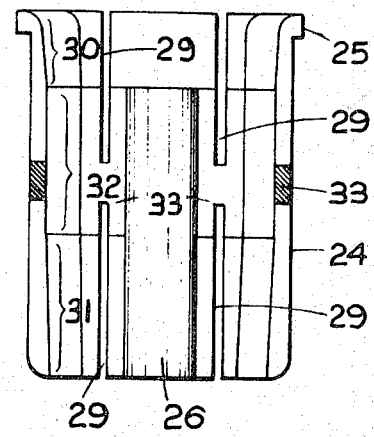
Fig. 2A.  Fig. 2B.
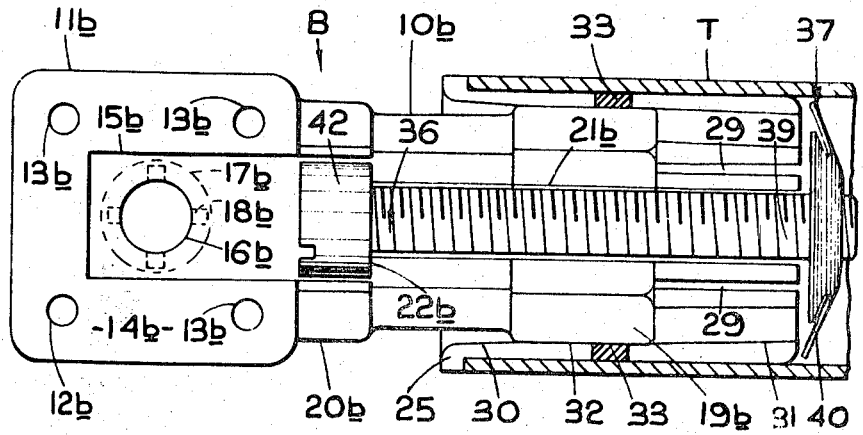
Fig. 3.

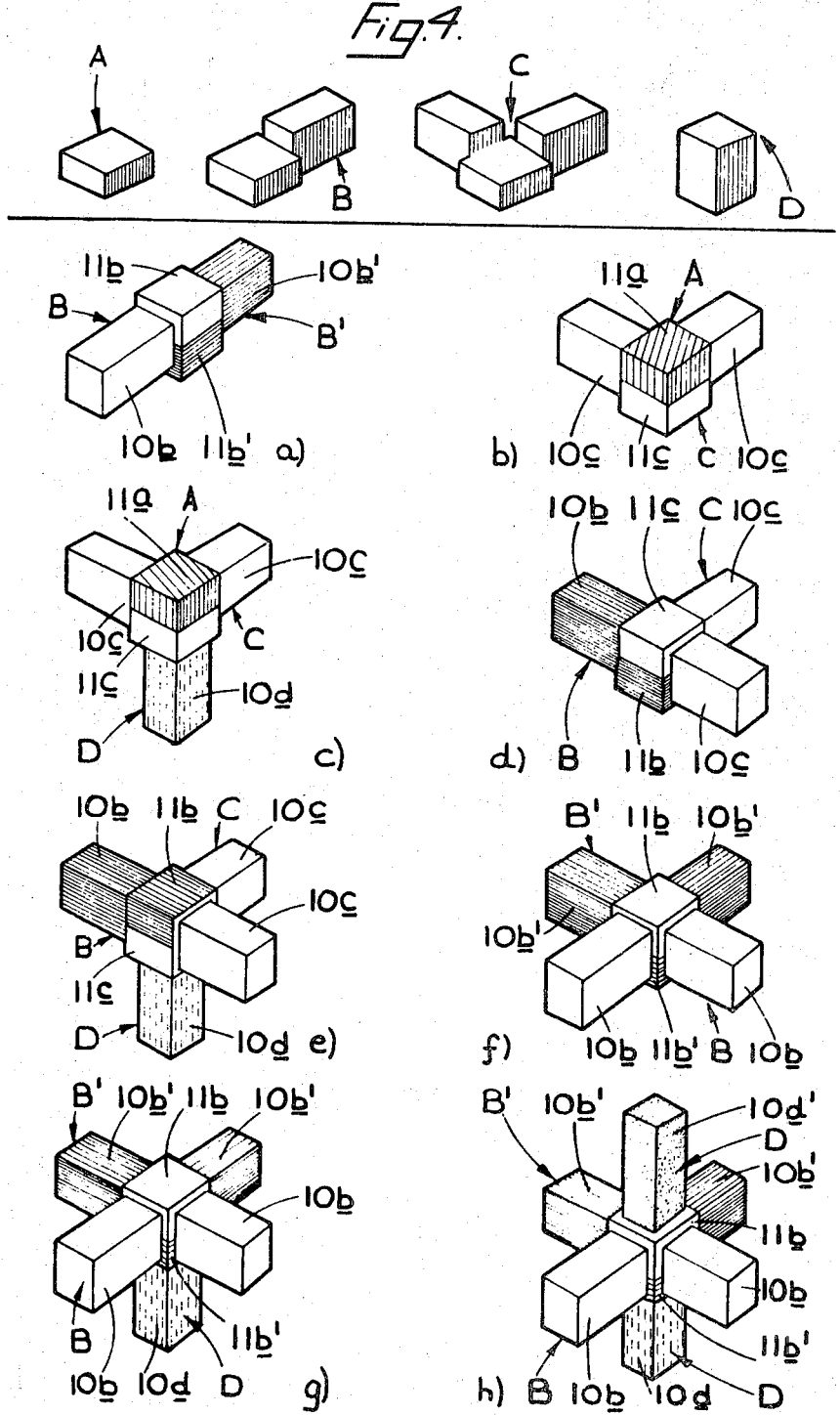

CONNECTING MEANS FOR JOINING TUBULAR MEMBERS

BACKGROUND OF THE INVENTION

1. Field of the Invention

This invention relates to connecting means for joining together tubular members to form a structure, for example a frame work work of such members.

2. Description of the Prior Art

In previously proposed arrangements the connecting means have included connection pieces comprising a body having two or more arms projecting therefrom to be received within the tubular members to be joined and retained therein either frictionally or by the use of fastening elements. In a rectangular frame system, eight different types of joint can be required, ranging from a simple joint for two members (either in alinement or at right angles) to a joint for six members meeting at a point. Each different type of joint therefore requires a different arrangement of arms on the body of the connection piece.

Each different connection piece has previously been formed generally as a one-piece construction so that a comparatively large number of different connection pieces are required thereby leading to comparatively high production costs. In one prior system the connection pieces are split in a plane containing the two arms so that each different connection piece can be assembled from two components each including half the body and half of each of the two arms. The number of different components required to form all the various types of connection piece is thus made less than the number of types of connection piece since the various components can be assembled in different combinations. But nevertheless the number of connection piece components which are required is still large, and since said components are made as injection mouldings they are expensive to produce due to the high cost of the number of different moulds required.

SUMMARY OF THE INVENTION

The object of the invention is to enable such connecting means to be constructed in a manner which permits them to be manufactured more economically but capable of forming rigid joints of neat appearance, and in particular to enable a wide range of different types of joint to be built up from tubular members of a given size with the minimum number of different parts.

According to the first aspect of the invention we provide a connection piece, for assembling tubular members into a structure, comprising a body formed from two body elements which are separable in a plane and two arms with their longitudinal centre lines extending in said planes (such arms being hereinafter referred to as coplanar arms) wherein said two coplanar arms are of unitary construction and are integrally formed either with respective ones of said body elements, or both with one of said body elements. By "unitary construction" we mean formed without separable parts.

Arms formed integrally with a body element are hereinafter referred to as primary arms, so that the arms specified above are primary coplanar arms.

The connection piece may also include one or more additional primary coplanar arms.

A further arm of similar form is provided on one or both of said body elements with its longitudinal centre line extending in a direction transverse to said plane, such arms being hereinafter referred to as transverse arms.

Such transverse arm is formed as a part structurally separate from the body element on which it is provided, the transverse arm and body element concerned having respective cooperating interfitting formations enabling them to be secured together in a predetermined positional relation.

Arms formed structurally separate from any body element are hereinafter referred to as secondary arms, so that the above mentioned arm is a secondary transverse arm.

According to the second aspect of the invention we provide connection means for assembling tubular members into a structure, comprising a connection piece according to the first aspect of the invention in combination with means for establishing frictional engagement between the arms and the inner surface of the respectively associated tubular members.

Said means for establishing frictional engagement comprise an expansible sleeve of internal dimensions such as to receive the arm and external dimensions such as to be received as a close fit within such tubular member, and screw means providing for relative longitudinal movement between the arm and such sleeve to establish outwardly directed pressure.

According to a further aspect of the invention we provide a set of components for forming connection pieces according to the first aspect of the invention, the set comprising a structurally separate body element, and body elements respectively with one or more arms formed integrally therewith and extending in said plane, the body elements of the components being capable of assembly in pairs which collectively afford two or more arms so that a plurality of connection pieces providing different respective arm arrangements can be built up from said components.

BRIEF DESCRIPTION OF THE DRAWINGS

The invention will now be described by way of example with reference to connection means as illustrated in the accompanying drawings wherein:

FIGS. 2A and 2B show, respectively in end view and in section on line 2–2 of FIG. 1, a sleeve adapted to cooperate with any of the arms of the above components, FIG. 3 shows a further type of connection piece component and the manner in which the arm thereof applies pressure to the sleeve at spaced positions during assembly with a tube to form a joint, and FIG. 4 shows in outline a set of components and the connecting pieces which can be formed from various combinations of the components for different types of joint.

DESCRIPTION OF THE PREFERRED EMBODIMENTS

Figure 1:
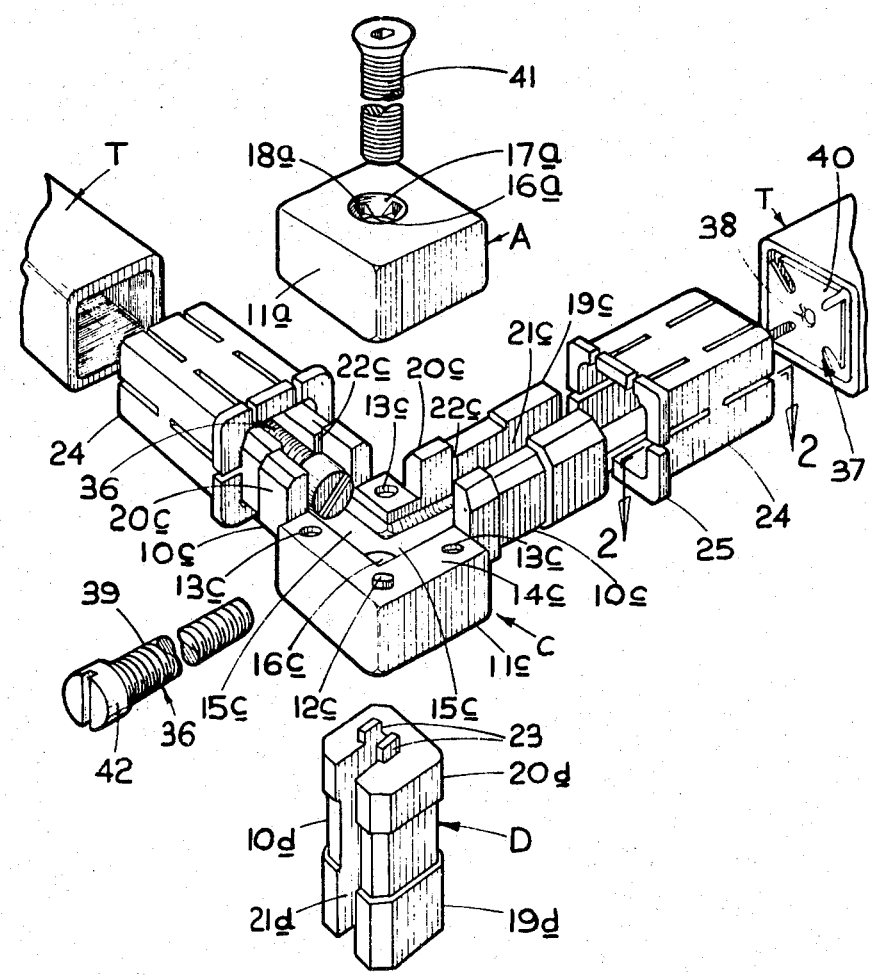
FIG. 1 shows a detailed exploded perspective view of one form of joint including connecting means comprising a connection piece formed from three different types of component.
Figure 1:
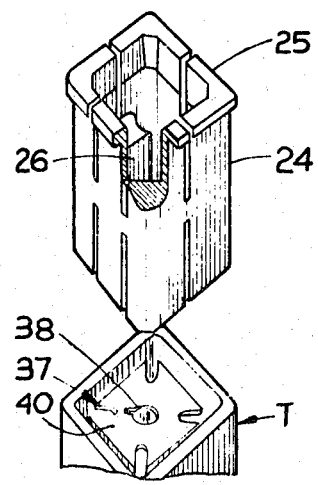

The components shown in FIG. 4 comprise a closure or cap unit A, a one-armed unit B, a two-armed unit C, and a secondary arm unit D. They are designed to be assembled with one another in a variety of ways as shown in FIG. 4 to form connection pieces suitable for eight different types of connection means. The various units are shown in detail in FIGS. 1 and 3 together with other parts required to form a complete joint.

The two-armed unit C, comprises two primary coplanar arms 10c projecting at right angles from adjacent sides of a body element 11c and integrally connected therewith. The body element 11c comprises a half cube which can be assembled with a generally similar body element to form a cubic body, the sides of which are equal to the external dimensions of the square section tubular members T which the connection pieces are designed to join. The arms 10c have their longitudinal centre lines extending in the plane of the inner face 14c of the body element 10c, i.e. the face which is brought into contact with a similar face on another similar body element when these are assembled together, and the term "coplanar" herein means lying in this plane.

The body element 11c is formed with a projecting spigot 12c and three recesses 13c adjacent to respective corners of its inner face 14c. The body element 11c is also formed with two grooves 15c of semicircular cross section which extend at right angles to one another from the centre of the inner face 14c to the adjacent sides from which the arms 10c project.

The body element 11c is also formed with a bore 16c extending perpendicularly to its inner face 14c and passing through the centre thereof. Adjacent to the outer face, i.e., that parallel to the inner face 14c of the body element 11c the bore 16c is countersunk and the countersunk portion is formed with four rectangular recesses. The countersunk portion and recesses are not visible in FIG. 1 but are similar to the corresponding parts 17a, 18a which can be seen on the outer face of the cap unit A shown in FIG. 1.

The two arms 10c are identical and each are of generally U-shape in transverse cross section, having a channel 21c extending longitudinally thereof. Each arm 10c is externally of octagonal shape in cross section (or of square shape with beveled corners) the sides thereof being parallel. Adjacent to the outer end of each arm 10c, i.e., the end remote from the body element 11c, there is formed a head portion 19c and at the inner end of each arm i.e., immediately adjacent to the body element 11c there is a similar root portion 20c. The root portion 20c has slightly larger dimensions than the head portion 19c, which in turn has slightly larger dimensions than the intermediate portion of the arm between the head and root portions. The portions 19c and 20c are all of octagonal shape in section and also parallel sides. The intermediate portion is conveniently, but not essentially, of similar shape and also parallel sided.

The channel 21c extending along the length of each arm opens out into the upper side thereof (as shown in the accompanying drawings) and is of increased width where it passes through the root portion 20c so as to afford a shoulder 22c. The increased width portion of the channel 21c forms an integral continuation of the groove 15c in the body element 11c.

The single armed unit B is shown in FIG. 3 in plan view and is generally similar to the two-armed unit C described above except that it has only one primary coplanar arm 10b and correspondingly only a single groove 15b. Corresponding parts of the various units are given the same reference numbers with suffix "a" for the cap unit A, "b" for the single armed unit B, "c" for the two-armed unit C, and "d" for the secondary arm unit D. Thus the foregoing description is applicable to the detailed construction of all of the units. Where any of such reference number is used without any suffix it is to be understood that it relates to the item generally without regard to which of units incorporates that item.

The cap unit A comprises a structurally separate body element 11a as shown in FIG. 1 and is generally similar to the body element 11b of the single-armed unit but has no grooves like 15b. Also it has two spigots in adjacent corners (corresponding to spigots 12b) and only two recesses (corresponding to 13b).

It will be apparent that the cap unit serves as a component having no arms but only a body element. The units A to C thus far described can be assembled together in a variety of ways to form a cubic body having two, three, or four primary coplanar arms, i.e., projecting in a plane of separation of the body elements.

The remaining unit is also shown in FIG. 1 and comprises a secondary arm unit D generally similar to the arms previously described but differing in the following aspects. This arm is not integrally formed with a body element but has two generally cubic spigots 23 projecting longitudinally from the end face adjacent to the root portion 20d. The channel 21d is of uniform cross section throughout its length and does not afford a shoulder like 22b.

The spigots 23 are dimensioned to be a tight fit within the recesses 18 in the countersunk portion 17 of the bore 16 extending through the body element 11 of any of the other units A, B or C. In this way a connection piece can be assembled having a transverse arm, i.e., one projecting transverse to the plane of separation of the body elements.

A sleeve 24, as shown in FIGS. 1 and 2, is provided for each arm of the connection piece. The sleeve is made as a moulding of a plastics material such as high density polyethylene or preferably an acrylonitrile-butadiene-styrene polymer and is of square section externally of a size to be received as a close fit within the tubular member T which are to be joined. The sleeve 24 is provided at one end with an outwardly projecting flange 25 which limits the extent to which the sleeve can be inserted within a tubular member. Internally of the sleeve and projecting from one side thereof is a slide member 26 dimensioned to be received within the channel 21 of the arm 10. The slide member 26 extends from the end of the sleeve remote from the flange 25 for a distance equal to the length of the narrower portion of the channel 21b, or 21c so as not to extend past the shoulder 22b, or 22c when assembled with a primary arm such as 10b, or 10c. The inner edge 27 of the slide member 26 is of part cylindrical form, so that when the sleeve is assembled with the arm the inner edge 27 in combination with the lower part of the channel 21 defines an aperture of dimensions sufficient to receive the shank of a screw 36 (FIGS. 1 and 3).

The internal surface of the sleeve 24 is of similar shape to the external cross section of the arm as will be evident from FIG. 2a. The internal surface of the sleeve includes an inner portion 30 extending from the end adjacent to the flange 25 and converging slightly towards the outer end, and a similarly converging outer portion 31 at the end remote from the flange 25, the two converging portions being joined by a parallel sided intermediate portion 32.

Longitudinal slots 29 are formed in the sleeve on each side of the slide part 26 and centrally in the remaining three sides of the sleeve, the slots extending from opposite ends of the sleeve towards the mid region so that the sleeve 24 comprises four corner parts 34 and a part 35 including the slide part 26 integrally connected by bridge portions 33. The slots 29 allow the sleeve to expand outwardly into the corners of the tube T.

The screw 36 is used to draw the arm fully into the sleeve after the latter has been inserted into the end of a tubular member. For this purpose an anchor element is provided. The anchor element comprises a generally concave resilient disc 37, preferably of corresponding shape to the tubular member and slightly undersize with respect thereto having a central aperture 38 of a size to engage the thread on the shank 39 of the screw 36 and a plurality of resiliently displaceable tongues 40. However, with at least the larger sizes of tube, it is possible to employ an anchor disc which is of circular shape whatever the shape of the tube, the disc then being of such diameter that it will engage the inner walls of a tubular member of a given size, but due to its resilience will bend slightly to allow it to be pushed inwardly along the tubular member.

For the secondary arm unit D a countersunk headed screw 41 is required to fit in the countersunk portion 17 of the cap unit A.

To assemble a joint the appropriate combination of units is chosen as described more fully in relation to FIG. 4 hereafter. A sleeve 24 is placed over each arm 10, a screw 36 is passed through each coplanar arm until its head 42 comes into abutment with the shoulder 22, and an anchor element 37 is threaded on to the screw where this projects endwise of the arm and sleeve. The anchor element 37 is arranged with its convex side facing forwardly with respect to the direction in which it has to be inserted into a tubular member. The anchor element is, as mentioned above, preferably of square form and slightly undersize so that it can enter the square tube easily as the arm and sleeve are inserted. When the sleeve is fully inserted so that its flange 25 abuts the end of the tubular member, the screw is tightened so as to tend to pull the anchor element towards the connecting piece. This causes the anchor element, when this is of square undersize form, to be drawn up into contact with the inner end of the sleeve and be flattened slightly so that its edges dig into the inner surface of the tube. Alternatively if a circular tight anchor disc is used this will dig in somewhat initially with the result that when the screw is tightened the disc tends to flatten slightly and dig into the inner surface of the tubular member more securely. Any movement of the disc along the tubular member will be limited by the disc coming into contact with the outer end of the sleeve. Further tightening of the screw then pulls the arm further into the sleeve, and the parallel sided head and root portions 19 and 20 of the arm engage corresponding outer and inner tapering portions 31 and 30 of the sleeve and apply an outward force thereto so that the sleeve grips the tube internally firmly at two spaced positions. Similarly the arm is gripped by the sleeve itself at two spaced positions so that the arm is held very securely within the tubular member.

In this way the coplanar arms of the connection piece extending in the plane of separation of the body elements 11 are assembled with respective tubular members.

Where the joint, as that shown in FIG. 1, requires a secondary arm unit D to provide a transverse arm, the secondary arm unit is then assembled with its sleeve and its spigots 23 are located in the corresponding recesses 18 in the appropriate one of the body elements 11 in the connection piece. A countersunk screw 41 is then passed through the bores 16 in the assembled body elements 11 and the secondary arm unit and its sleeve are assembled with their associated tubular member in a similar manner to that previously described. In the case of the joint shown in FIG. 1 this last mentioned screw 41 also serves to secure the body element 11a comprising the cap unit A to the body element 11c of the two-armed unit C.

By suitable choice and combination of the four units eight different types of connection piece can be fabricated for connection means to make the various types of joint shown in FIG. 1. In this figure the various units employed in each connection piece are shaded differently in order to make it clear which arm is integral with which body element, and where any piece includes two similar components, the parts of those components are distinguished by priming the reference numbers of one of the components, e.g. 10b, 10b'.

The eight types of joint which can be assembled comprise:
a. A straight joint formed from two single-armed units B.
b. A right angle joint formed from a two-armed unit C plus a cap unit A.
c. A nonplanar three-way joint formed from a two-armed unit C plus a cap unit A and a secondary arm unit D.
d. A planar three-way joint formed from a two-armed unit C plus a one-armed unit B.
e. A nonplanar four-way joint formed from a two-armed unit C plus a one-armed unit B and a secondary arm unit D.
f. A planar four-way joint formed from two two-armed units C.
g. A five-way joint formed from two two-armed units C plus a secondary arm unit D.
h. A six-way joint formed from two two-armed units C plus secondary arm units D.

In all cases the secondary arm units are secured to the body elements, and their sleeves are expanded, by means of the screw 41 which is used to secure the two body elements 11 of the various other units together. In the case of the six-way joint, since this can only occur in the middle of a three dimensional framework structure, a long screw is required to extend from the joint at the opposite end of one of the tubular members in which is received one of the secondary arms.

In some cases it may be desirable to provide a joint in which two of the primary arms can be set at any desired angle, or indeed be free to swivel with respect to one another. For this purpose a unit may be formed with a body element which is rounded on the side remote from the arm, and no interfitting formations being provided to locate these body elements in any given relationship. A joint formed in this manner is particularly useful in constructing folding screens or display panels.

It will be understood that adapter units may also be provided, such units including a body element of a size corresponding to a particular size of tube and a primary arm corresponding to a smaller size of tube, thus enabling a framework to include tubes of differing sizes.

The invention may, of course, be adapted to joining tubular members of other than square section, for example round or hexagonal, by making the arms and sleeves of appropriate sectional shape. It can also be adapted for joining any such tubular members at angles other than right angles. For example the body of the connection piece could be in the form of a three (or more) sided prism with primary coplanar arms radiating from two or more sides of the prism and optionally additional primary or secondary transverse arms extending from the end faces of the prism.

I claim:

1. A connection piece for assembling tubular members into a structure, the connection piece comprising a body divided on a reference plane into two structurally separate body elements assembled together and having mutually contacting faces extending in said reference plane, at least two arms each of which are of unitary construction and having a median plane coextensive with said reference plane, at least one of said body elements having at least one of said arms integrally formed therewith, and any remaining ones of said arms being integrally formed with the other one of said body elements, and a further structurally separate arm provided on at least one of said body elements and extending transversely of said plane, and transversely extending arm and said body element having respective cooperating interfitting means for locating them in a predetermined positional relation to each other, and means being provided for securing said transversely extending arm and said body element together in said relation.

2. A connection piece as claimed in claim 1 wherein said means for securing said transversely extending arm and said body element together also serves for securing said body elements to one another.

3. Connection means for assembling tubular members into a structure comprising:
   a. a connection piece comprising:
      b. at least two arms disposed within respective tubular members, and arms extending in a common plane and each being of unitary construction;
      c. a body comprising two body elements assembled together and having mutually contacting faces in said plane, at least one of said body elements having at least one of said arms integrally formed therewith, and any remaining ones of said arms being integrally formed with the other one of said body elements; and
   d. means for establishing frictional engagement between said arms and said tubular members comprising:
      e. respective expansible sleeves associated with said arms each having a pair of longitudinally spaced surface portions which converge internally away from said body portion;
      f. a pair of longitudinally spaced parallel sided contact portions on said arms respectively arranged to contact said pair of converging surface portions of said sleeves respectively, that contact portion of each arm which is further from said body element with which said arm is integrally formed being of smaller cross-sectional dimensions than the other contact portion of said arm; and
      g. means for establishing relative longitudinal movement between said arms and said respectively associated sleeves thereby to establish pressure engagement between said sleeve and said tubes at longitudinally spaced points by interaction of said contact portions of said arms and said converging portions of said sleeves.

4. Connection means as claimed in claim 3 wherein said means for establishing said relative longitudinal movement between each said arm and said respectively associated sleeve comprises:
   a. a screw element extending longitudinally through said arm and having a head member;
   b. abutment means on said arm to engage said head member of said screw element and to transmit longitudinal movement from said screw to said arm; and
   c. anchor means for gripping said tubular member internally and having screw thread means engaging said screw element for enabling arm to be drawn into said sleeve by rotation of said screw element.

5. Connection means as claimed in claim 4 wherein said anchor means comprises a generally frustoconical resilient disc of a shape corresponding to that of said tubular member and of a size slightly less than the interior size of said tubular member.

6. A connection piece as claimed in claim 1, selected from components comprising:
  a. cap units comprising said body elements each of structurally separate form;
  b. one-armed units comprising said body elements each having integrally formed therewith a single one of said arms, which have a median plane coextensive with said reference plane; and
  c. two-armed units comprising said body elements each having integrally formed therewith two of said arms which have a median plane coextensive with said reference plane, whereby a plurality of different connection pieces providing respective arm arrangements can be built up from pairs of said units.

7. A set of components as claimed in claim 6 further comprising arm units comprising respectively said arms each of structurally separate form.